United States Patent
Yellamraju (10) Patent No.: US 8,483,284 B2
(45) Date of Patent: Jul. 9, 2013

(54) METHOD AND APPARATUS FOR GRID-BASED INTERACTIVE MULTIMEDIA

(75) Inventor: SivaKiran Venkata Yellamraju, Santa Clara, CA (US)

(73) Assignee: ViVu. Inc., San Jose, CA (US)

( * ) Notice: Subject to any disclaimer, the term of this patent is extended or adjusted under 35 U.S.C. 154(b) by 1200 days.

(21) Appl. No.: 12/274,625

(22) Filed: Nov. 20, 2008

(65) Prior Publication Data

US 2009/0129479 A1    May 21, 2009

Related U.S. Application Data

(60) Provisional application No. 60/989,457, filed on Nov. 21, 2007.

(51) Int. Cl.
*H04N 11/02* (2006.01)
(52) U.S. Cl.
USPC .................................................. 375/240.24
(58) Field of Classification Search
USPC .................................. 375/240.24–240.26
See application file for complete search history.

(56) References Cited

U.S. PATENT DOCUMENTS

| | | | |
|---|---|---|---|
| 7,885,338 B1* | 2/2011 | Bushell | 375/240.25 |
| 2003/0072370 A1* | 4/2003 | Girod et al. | 375/240.13 |
| 2003/0103571 A1* | 6/2003 | Meehan et al. | 375/240.27 |
| 2004/0131076 A1* | 7/2004 | Smith | 370/432 |
| 2004/0258104 A1* | 12/2004 | Li | 370/537 |
| 2006/0018379 A1* | 1/2006 | Cooper | 375/240.12 |

\* cited by examiner

*Primary Examiner* — Gilberto Barron, Jr.
*Assistant Examiner* — David Le
(74) *Attorney, Agent, or Firm* — Wong, Cabello, Lutsch, Rutherford & Brucculeri, L.L.P.

(57) ABSTRACT

Methods and apparatus for generating an interactive video stream from a plurality of multimedia components based on a state definition is disclosed. A plurality of multimedia components are retrieved in accordance with the state definition. The plurality of multimedia components are decoded. The plurality of multimedia components are retimed to a common frame rate. The multimedia components are then scaled and multiplexed into a multiplexed video stream, in accordance with the state definition.

18 Claims, 6 Drawing Sheets

METHOD AND APPARATUS FOR GRID-BASED INTERACTIVE MULTIMEDIA

CLAIM OF PRIORITY

This application claims the benefit of U.S. Provisional Patent Application No. 60/989,457 titled "Grid-Based Interactive MultiMedia Emulation" filed Nov. 21, 2007.

BACKGROUND OF INVENTION

1. Field of the Invention

This invention generally relates to the field of streaming multimedia components over a network. More particularly, the invention relates to a method and apparatus for enabling interactivity with multiplexed multiple live, stored, or dynamic multimedia content.

2. Background and Description of the Related Art

Several of the techniques in this domain to enable interaction are based on the ability to browse and select still images, or Video on Demand Solutions based on a single video source. There are also several applications where locally, in predefined grid areas the multimedia is rendered. There are implementations of interactive flow responsive units such as IVR, which is purely based on voice solutions.

The problem with these solutions is that it is challenging to integrate multiple video streams with different codecs and frame rates, to present this at the user device as if it were from a single source, and to allow interaction with multiple multimedia components from a single source. None of the interactive solutions currently available have video with programmable hot spots that are user selectable through mouse, keyboard, DTMF, voice recognition, or other interactive devices.

There is also an issue with multimedia and flexible state machines. Because of the need to store all of the information associated with each state at the server in the prior art, the state machine associated with a process driven by multimedia displays cannot be very complex or the number of users will quickly overwhelm the system.

What is desired is an apparatus to enable interaction between a client device and content created by multiplexing and incorporating the content from multiple live or stored multimedia streams into a single multimedia stream. Also, to be able to create complex state machines driven by these multimedia streams using interaction with a variety of client devices to move the state machine from one state to the next.

SUMMARY

In one embodiment, a method for the generation of an interactive video stream from a set of multimedia components based on a state definition, the method including the retrieval of a one or more multimedia components, decoding the multimedia components, retiming the multimedia components, scaling the multimedia components, and multiplexing the multimedia components into a single video stream.

In another embodiment, the state definition includes a reference to the content stream, a mapping of a response to the content, and a reference to another state definition to be used upon receipt of that response.

BRIEF DESCRIPTION OF THE DRAWINGS

A better understanding of the present invention can be obtained from the following detailed description in conjunction with the following drawings, in which.

The figures are provided in order to provide a thorough understanding of the present invention. The figures should not be construed as limiting the breath of the invention in any manner.

DETAILED DESCRIPTION

Multimedia presentations can be delivered to people for viewing and interaction using a variety of devices such as computers, cell phones, PDA's, etc. These devices, which we will refer to collectively as client devices, allow for viewing in multimedia in different formats, with differing bandwidths and with different interactive capabilities.

An approach for multiplexing and incorporating the content from multiple live or stored multimedia (text, audio and/or video) components into a single multimedia stream to any device capable of handling multimedia (web client, mobile devices such as cell phone/PDA, IM client, etc) is described. This approach also encompasses a flexible mechanism that allows presentation of individual multimedia stream in the final multiplexed multimedia stream as well as a programmatic interface to define the user interactions on the multiplexed multimedia stream.

The allowed interactions between client devices and the multimedia components are defined as a series of states, which when all the possible states are collected is called a state machine. Each state defines a collection of multimedia components to be combined into one output video stream, how those components will be combined, the interaction associated with each component, and the result of that interaction.

In one or more embodiments, a state consists of a set of regions to be mapped to the client device display. In one or more embodiments, each region is used to define the rendering of some multimedia component on the client device's display. In one or more embodiments, each region also has a designation stating how the client device will interact with it and, when the client device does send a response, what the resulting new state will be.

The set of regions, as being referred to in this document, may refer to any collection of regions which make up a set of overlapping or non-overlapping regions within a geometry, where the geometry includes but is not limited to squares, rectangles, circles and ellipses.

In one or more embodiments, each multimedia component to be used in the multiplexed output signal is defined by its source. A multimedia component may come from an external source such as live video. A multimedia component may also come from an internal source such as a canned video stream, text field, graphic, etc. In one or more embodiments, included in the definition must be enough information to enable the system to stream it at a constant frame rate and at a specific size. This is usually only an issue for video streams which have a pre-defined frame rate, codec, and other characteristics which the system must take into account to properly include each multimedia component in the output video stream.

Multimedia components can include but are not limited to text, audio and video streams. In one or more embodiments, the user interactions may be through any means supported by that network, such as DTMF tones, voice activation, mouse clicks, keyboard, scripting languages, timers, etc.

In one or more embodiments, each state machine also has a specified default or initial state. When a request is received from a client device to obtain access to a given state machine, the initial state will be used to determine what will initially be presented to the client device. A state may be defined using a script which includes the layout of the streams (how it looks), the content of the streams, and what to do when something happens based on some action such as user input, timer expiry.

The characteristics of the client device are taken into account to determine the format of the stream to be presented to the client device (i.e. a mobile phone client will have a different video stream format from a client device using a standard web browser). When the client device sends a request, the header information in the request can be used to determine what type of hardware the client device is and so how to format the display to that client device. It is also assumed that the client device is coupled to the embodiment over a network, such as the internet, or a cell phone network.

Figure 1:
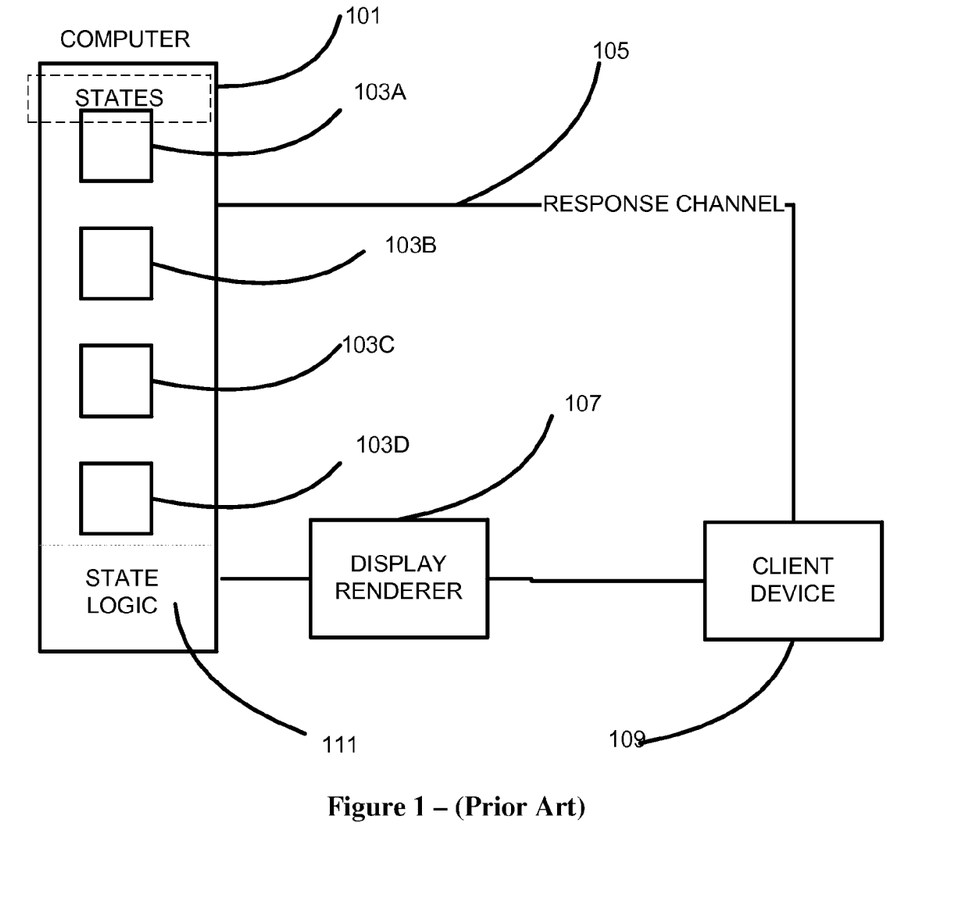
FIG. 1 illustrates the process of interacting with multimedia in the prior art.

FIG. 1 shows an embodiment of the prior art. A computer 101 maintains a set of possible states 103A . . . 103D. Each possible state contains all of the necessary media information to expose that state to a client device 109. The state of the display sent to each client device is maintained within state logic 111 inside the computer, and a display renderer 107 will present the state information to the client device as a stream. A response channel 105 is provided on the client as part of the display. The display renderer 107 can only handle a single active channel at one time and all of the state information needs to be stored in the computer. The state logic 111 being separate from the states 103A . . . 103D greatly increases the complexity of the solution, and the response channel 105 is part of the display generated from the state logic 111 again increasing the complexity of the solution.

Figure 2:
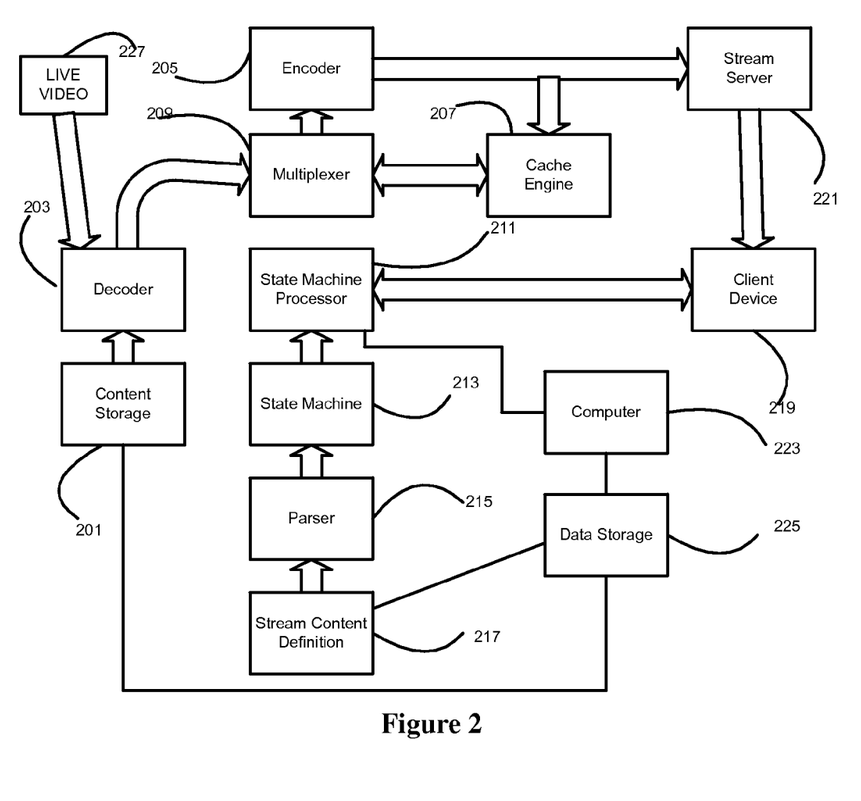
FIG. 2 illustrates the process by which streams are delivered to a client device and the client interacts with them in accordance with one or more embodiments.

FIG. 2 shows one possible embodiment of an apparatus to enable a state machine to be driven by responses to a video stream which is made up of a plurality of multimedia components. Static content can be stored in Content Storage 201 which is associated with the Data Storage 225 associated with one or more computers 223. Content for each state is defined in a Stream Content Definition 217, which includes a definition mapping content or lack thereof to each region. One embodiment of the definition is an HTML table specification. The Stream Content Definition 217 also contains a reference to the content stream, what input the content stream is to be associated with, and what the next action is if that input is used. The Stream Content Definition 217 is passed through a Parser 215, which becomes a state in a state machine 213. The state machine image is stored in the State Machine Processor 211 for later processing. The Parser 215 and State Machine Processor 211 may be embodied by one or more computers 223. The State Machine Processor 211 acts as a coordinator between the other active and storage units including the Parser 215, Stream Content Definition 217, State Machine storage 213, Multiplexer 2109, Encoder 205, Cache Engine 207, Decoder 203, Content Storage 201, and source for Live Video 227.

In one or more embodiments, when a request comes in from a client device 219 that is interpreted as a state machine request, the State Machine Processor 211 selects the state of the State Machine 213 that has been designated as the initial state. In one or more embodiments, there is only one initial state per state machine. The State Machine Processor 211 will fetch the streams either from the content storage 201 or from some external live source 227 and route those streams to the decoder 203.

Each multimedia component not only needs to be decoded, it needs to be normalized in the sense of creating an output stream with a common frame rate and scaled to fit the region of the output stream that it will occupy. in one or more embodiments, the multiplexer will act to normalize each stream by retiming the video streams so that the stream frame rate matches that of the desired frame rate for the specific client, the stream has been normalized (codec coding has been removed), and the stream has been resized to fit the region it will be placed into. This functionality may not be restricted to a physical multiplexer; it could be accomplished by a separate pre-processor device or some software embodiment.

Once the components have been normalized, the streams associated with the components are put through the multiplexer 209 to create a single video stream. The multiplexer 209 combines the various streams into a single frame by placing each stream at a position in the frame based on the stream content definition 217 associated with the state. This is all done under the command of the State Machine Processor 211.

From the current state, the source for the different streams is determined and each stream is properly decoded and normalized. In one or more embodiments this decoding and normalization may include changing the frame and bit rate, resizing a graphical component to fit into its intended region, and normalizing the codec. In one or more embodiments, raw data streams with identical video qualities are created through the decoding and normalization, so they can be merged into a single stream.

As part of this process, the State Machine Processor will also command the multiplexer to scale video frames of each content source to appropriate sizes to fit into the given layout of regions in the state definition. If there is any dynamic content such as text or graphics, it is rendered properly and scaled to fit into the layout.

The multiplexed stream is then encoded via the encoder 205 in a video format that is compatible with the client based on the known characteristics of the client. The video format is determined based on the original client request by the State Machine Processor 211, as that contains header information as to what type of device it is. The State Machine Processor 211 can then command the encoder to properly encode the multiplexed stream. In one or more embodiments, if the some of the content associated with a state does not include live content, that content can be cached. Then the live streams can be multiplexed into the single cached stream. In one or more embodiments, a cache engine 207 can be inserted between the encoder 205 and stream server 221 to reduce the amount of processing that needs to be done. If the state includes static content, that part of the stream may be decoded, multiplexed and encoded once for a specific client then stored in the cache engine or some other storage for later retrieval. The state machine processor 211 may query the cache engine to see if the state already exists for the given client type, and if it does skip all the processing and send the stream directly from the cache engine 207.

In one or more embodiments, when the client device 219 responds to the encoded video stream, the state machine processor 211 will interpret that response based on the current state associated with the client device 219 and the response associated with that input in the stream content definition 217.

In one embodiment, calibration information associated with the client device 219 can be accepted from the client device and can be used to determine the variations of the bandwidth to client device so that the streaming can be adjusted accordingly. In another embodiment, calibration information can be received from a stream server 221 being used to stream the content to the client.

When the client device 219 interacts with any state, including the initial state, the current state information will determine what state to move to from the current state and the display will be re-rendered accordingly.

One embodiment of the decoding step is to adjust the frame rate of the video input stream by using a method called time bucketing. In time bucketing, each video stream is presented at its input rate into a buffer, and the buffer is written out at a common rate that is correct relative to the client frame rate. This may cause frames to be dropped if the frame is only partially updated or missed, duplicated if the input frame rate is slower than the common frame rate, or ignored if the input frame rate is faster than the common frame rate.

Figure 3:
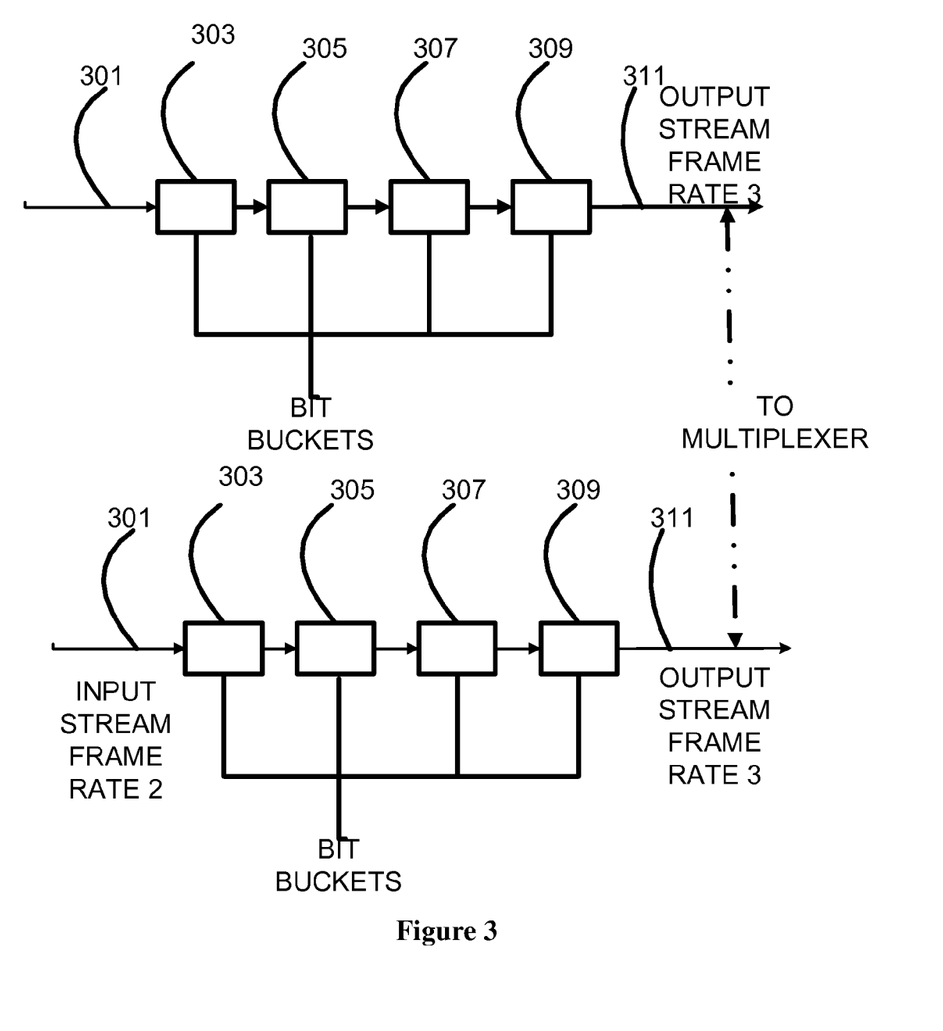
FIG. 3 shows the time bucketing method used to deliver video at a constant frame rate in accordance with one or more embodiments.

FIG. 3 shows how the time bucketing to the multiplexer works for a multiplicity of video streams whose frame rates must be reset. Each input stream enters at its given frame rate 301, then is sent through a series of frame buffers 303, 305, 307, 309, where it is read in at the input frame rate. Each stream is then read out at a common frame rate 311. If a frame has not completely updated the last good frame will be repeated or no frame will be output if none were available. If a frame is updated at a higher rate than the common rate then some frames will be skipped over. If a frame is input at a lower rate than the common rate than the frame may be output more than once. Each video stream is retimed to a common frame rate, at which point it can be resized and multiplexed into a single video stream.

When a request is received by the state machine processor 211 to associate a state with a client device 219, the multimedia content is located in the content storage 201 or as a live stream 227. The state machine processor 211 directs each content stream to a decoder 203, which takes into account that each stream may be encoded differently and resulting that all streams are decoded into a native (raw) form.

Once the content streams have been normalized and scaled, the state machine processor controls the multiplexing of these streams by copying each piece of the stream into an empty frame in the memory of the required size which is passed on as part of the raw stream.

The feedback channel from each client is fed back to the state machine processor through same carrier/interface as the multiplexed stream going to the client. This feedback channel is used as an input to the state machine processor to manipulate the state of the display to the client device based on the mapping of each input to each region of the state and from there to another state, thus making each video stream interactive.

Figure 4:
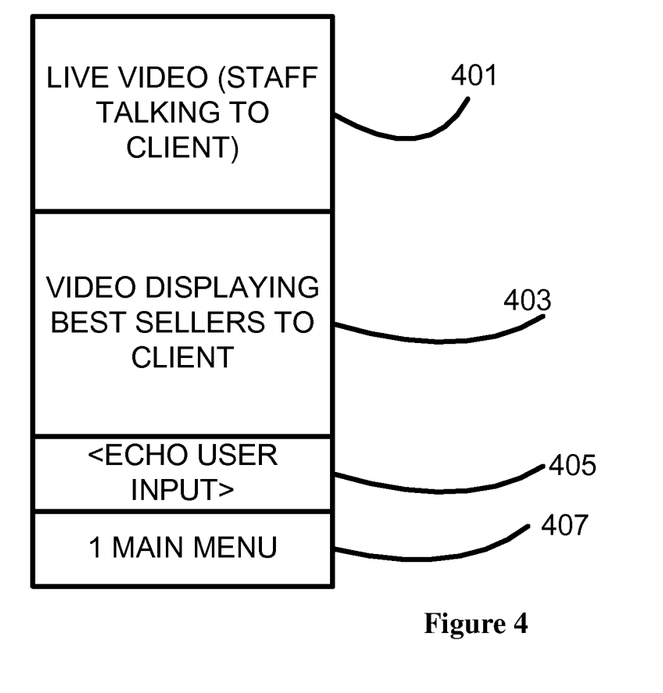
FIG. 4 shows an example of a video session as a bookstore catalog session in accordance with one or more embodiments.

FIG. 4 shows an example of a video session as a bookstore catalog session in accordance with one or more embodiments. In this case we have a live video 401 of staff talking to the client. At the same time, there is a video in another window presenting to the client the best selling books 403. The client can respond with user input that is echoed back to him 405. The part of the stream that contains live video would not be cached in our model since it would change significantly over time, but the other multimedia components associated with the state could be. Using a different input modality such as DTMF or a mouse click, you can send a response back from the client device to return to the main menu 407.

Figure 5:
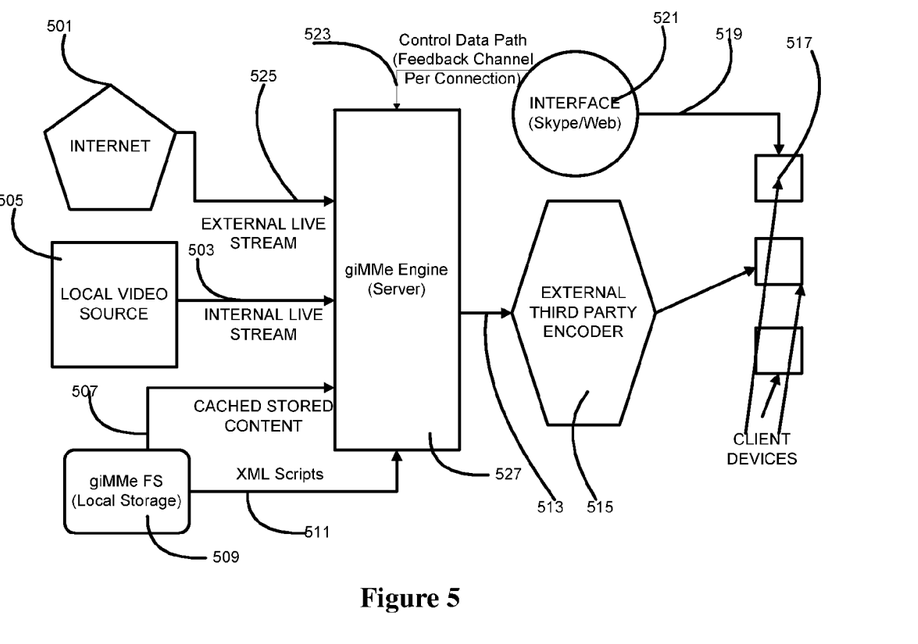
FIG. 5 shows one physical embodiment of an apparatus which enables interaction of client devices with a state machine driven by a plurality of multimedia components.

FIG. 5 illustrates an embodiment of this invention. The giMMe Engine 527 may handle multiple content sources. The giMMe File System 509 is the local storage system on the giMMe engine which stores content 507 (video, audio) and scripts 511 used to drive the state engine within the giMMe engine. The live streams coming into the engine core could be internal 503 (directly connected to the machine—for instance, a camera directly connected 505) or external live streams 525 coming over the internet 501 (for instance, webcast from CNN's website). It also renders dynamic content if required (programmed text, graphics etc) and multiplexes these streams onto a freshly generated raw stream per connection 513 to each client 519. These streams could be encoded to a client 517 to go over an interface such as Skype™ 521, or via a third-party encoder 515. Control and feedback paths 523 are provided to enable update of displays to client devices based on the current state, and calibration of the output streams.

Figure 6:
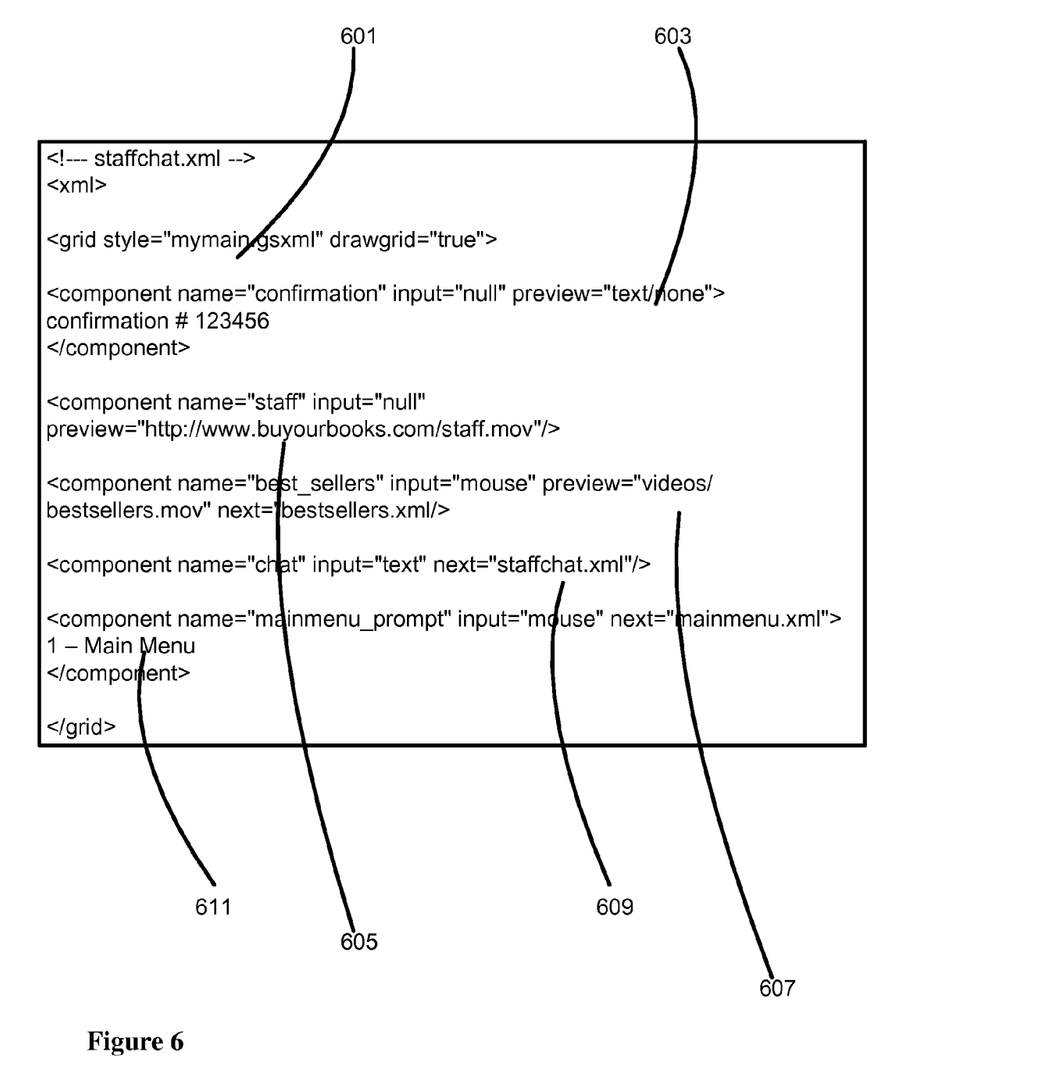
FIG. 6 shows one way of expressing the state definition in accordance with one or more embodiments.

FIG. 6 shows an embodiment of a state, in this example the chat display of FIG. 4. The grid line 601 defines the link to the definition file ("mymain.gsxml") and whether or not to draw a grid as part of the display (in this case "true" so it would). Each component line 603, 605, 607, 609, 611 defines the plurality of components associated with this state. The first component 603 is named "confirmation", has no input ("null") and presents a text label which says "confirmation #123456". The second component 605 is named "staff", has no input ("null") but has a live stream from a URL in its preview. The third component 607 is named "best_sellers" which displays a movie from a local source and accepts an input from a mouse, which when clicked will drive the state using a document named bestsellers.xml. Next component 609 is named chat, accepts text and on input returns you to this state, staffchat.xml. Finally a component 611 which is named "mainmenu_prompt accepts a mouse input, displays a label "1—Main Menu" and upon receiving the input the state engine processor will change the state using a file named mainmenu.xml.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A method for generating an interactive video stream from a plurality of multimedia components based on a state definition, the method comprising:
retrieving the plurality of multimedia components in accordance with the state definition;
performing any required processing of the retrieved multimedia components in accordance with the state definition, the processing including one or more of decoding, retiming to a common frame rate, and scaling of the plurality of multimedia components;
multiplexing the processed multimedia components by stitching and shifting the processed multimedia components together into a single video stream such that each component occupies a region of the interactive video stream determined in accordance with the state definition.

2. The method of claim 1, wherein the state definition includes:
a plurality of multimedia component definitions, each of the plurality of multimedia component definitions including:
a reference to a multimedia stream associated with each multimedia component;
a mapping of the multimedia stream to a region associated with a client device video display;
a mapping of a response to be associated with each of the plurality of multimedia component definitions; and
a reference to another state definition to be used upon receipt of the response.

3. The method of claim 2 where the location of the multimedia stream is one of a stored location or a live feed from a local or remote network location.

4. The method of claim 1, wherein one or more of the plurality of multimedia components have codecs that are different from codecs of remaining of the plurality of multimedia components.

5. The method of claim 1, wherein one or more of the plurality of multimedia components has a frame rates that is different from the frames rates of at least one other of the plurality of multimedia components.

6. The method of claim 1, wherein a request is accepted from a client device and the common frame rate determined by the request.

7. The method of claim 1, wherein the retiming is performed by reading frames at the multimedia component frame rate and writing them out at a common frame rate, wherein only complete frames are being written out.

8. The method of claim 2, wherein the scaling is performed by transforming the multimedia stream associated with each of the multimedia components to map to a region in accordance with a multimedia component definition.

9. The method of claim 1, wherein at least one of the plurality of multimedia components which are associated with static multimedia content are multiplexed, encoded, and cached.

10. The method of claim 9, wherein a cached multiplexed video stream is multiplexed with at least one live multimedia components to generate an interactive multiplexed video stream.

11. The method of claim 1 wherein the multiplexed video stream is delivered to a client device on a carrier signal enabling the use of a carrier feedback signal to accept input from the client device.

12. The method of claim 11, where the client device is a networkable multi-media capable interactive device.

13. A method for delivering an interactive video stream to a client device, the method comprising:
accepting a request from the client device;
calculating a video format from the request;
calculating a common frame rate from the request;

calculating a state definition required by the client device from the request;
retrieving the state definition;
retrieving each of a plurality of multimedia components in accordance with the state definition;
decoding each of the plurality of multimedia components;
scaling each of the plurality of multimedia components in accordance with the state definition;
retiming the frame rate for each of the plurality of multimedia components to the common frame rate by reading each of the plurality of multimedia components in at the input frame rate associated with each of the plurality of multimedia components and writing each of the plurality of multimedia components out at the common frame rate, allowing for skipping of frames which are not complete or where frames are read in faster than they are written out, and duplication of frames where frames are read in slower than they are written out;
multiplexing each of the plurality of multimedia components in accordance with the state definition into a multiplexed video stream; and
encoding the multiplexed video stream in accordance with the video format.

14. The method in claim 13, where the encoded multiplexed video stream is forwarded to the client device over a network via a carrier or third-party video server.

15. An apparatus for the generation of an interactive video stream from a plurality of multimedia components based on a state definition, the apparatus comprising:
a decoding means for decoding each of the plurality of multimedia components;
a multiplexing means for multiplexing each of the plurality of multimedia components into the interactive video stream;
an encoding means for formatting the interactive video stream;
a means for sending video streams to and accepting responses from a client device;
a computer-readable medium carrying one or more sequences of instructions for generating an interactive video stream from a plurality of multimedia components, wherein said sequence of instructions, when executed, performs:
accepting a request from the client device;
calculating a video format required by the client device from the request;
calculating a state definition from the request; decoding each of the plurality of multimedia components;
scaling each of the plurality of multimedia components in accordance with the state definition;
retiming each of the plurality of multimedia components in accordance with the state definition;
multiplexing each of the plurality of multimedia components in accordance with the state definition into a single multiplexed stream; and
encoding the single multiplexed stream in accordance with the video format.

16. The apparatus in claim 15, the apparatus further comprising a first storage means for state definitions, wherein the sequence of instructions retrieves the state definition from the first storage means based on the state definition calculated from the client request.

17. The apparatus in claim 15, the apparatus further comprising a second storage means for multimedia components, wherein the sequence of instructions retrieves the plurality of multimedia components from the second storage means in accordance with the state definition.

18. The apparatus in claim 15, where the encoded video stream is forwarded to the client device over a network via a carrier or third-party video server.

* * * * *

UNITED STATES PATENT AND TRADEMARK OFFICE
CERTIFICATE OF CORRECTION

| | | Page 1 of 1 |
|---|---|---|
| PATENT NO. | : 8,483,284 B2 | |
| APPLICATION NO. | : 12/274625 | |
| DATED | : July 9, 2013 | |
| INVENTOR(S) | : Sivakiran Venkata Yellamraju | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this
Twenty-seventh Day of January, 2015

Michelle K. Lee
*Deputy Director of the United States Patent and Trademark Office*